United States Patent
Olen (10) Patent No.: US 6,750,802 B1
(45) Date of Patent: Jun. 15, 2004

(54) REMOTE CONTROLLER WITH PROGRAMMABLE FAVORITE KEYS

(76) Inventor: Richard Olen, 459 Harbor Cir., Shoreview, MN (US) 55126

( * ) Notice: Subject to any disclaimer, the term of this patent is extended or adjusted under 35 U.S.C. 154(b) by 536 days.

(21) Appl. No.: 09/780,226

(22) Filed: Feb. 9, 2001

(51) Int. Cl.$^7$ ................................................ G08C 17/00
(52) U.S. Cl. .................... 341/176; 345/169; 340/825.72
(58) Field of Search .................... 341/176, 173, 341/180; 455/151.1, 151.2, 151.4, 158.1, 160.1; 348/569, 570; 345/169; 340/825.72

(56) References Cited

U.S. PATENT DOCUMENTS

| | | | |
|---|---|---|---|
| 4,412,218 A | 10/1983 | Niitsu | 340/825.56 |
| 4,959,810 A | 9/1990 | Darbee et al. | 364/900 |
| 5,345,226 A | 9/1994 | Rice, Jr. et al. | 340/825.19 |
| 5,414,426 A | 5/1995 | O'Donnell et al. | 341/176 |
| 5,654,714 A | 8/1997 | Takahashi et al. | 341/176 |
| 5,726,645 A | 3/1998 | Kamon et al. | 340/825.22 |
| 5,745,068 A | 4/1998 | Takahashi et al. | 341/176 |
| 5,761,604 A | 6/1998 | Stough | 455/3.2 |
| 5,781,247 A | 7/1998 | Wehmeyer et al. | 348/569 |
| 5,847,305 A | 12/1998 | Yoshikawa et al. | 84/634 |
| 5,959,751 A | 9/1999 | Darbee et al. | 359/148 |
| 6,166,778 A | * 12/2000 | Yamamoto et al. | 348/569 |
| 6,215,531 B1 | * 4/2001 | Beery | 348/734 |

FOREIGN PATENT DOCUMENTS

JP 10-285480 10/1998

OTHER PUBLICATIONS

Fobis Technologies Inc., "designing gadgets for real life", pp. 1–16, www.weemote.com.

* cited by examiner

*Primary Examiner*—Michael Horabik
*Assistant Examiner*—Hung Dang
(74) *Attorney, Agent, or Firm*—Dicke, Billig & Czaja, PLLC (57) ABSTRACT

A remote controller to control an electronic device has a programmable favorite key which is programmed so that an operation on the favorite key shifts the working channel on the controlled electronic device to a favorite channel associated with the favorite key. The favorite key transmits a sequential string of command signals comprising a number of channel shifting command signals, which number is determined according to a predetermined relation on the basis of a relative index number of the favorite channel in a plurality of indexed channels.

15 Claims, 5 Drawing Sheets

REMOTE CONTROLLER WITH PROGRAMMABLE FAVORITE KEYS

PREFERENCE TO RELATED APPLICATIONS

None

BACKGROUND OF THE INVENTION

The present invention relates to remote control devices for electronic devices, and more particularly to a remote control device which has programmable favorite keys to allow quick access to preselected favorite channels or programs.

Remote control devices for electronic devices have come into wide use recently. Using such remote control devices, the user can operate the main function of the electronic device from far away. A wide range of electronic devices can be remotely controlled. The examples include home electronic equipment such as television sets, videotape recorders, stereo receivers, compact disk players, and other electronic devices used in business environment.

A remote control device controls an electronic device by transmitting command data as command signals having predetermined modulated carrier frequencies using infrared signals or electromagnetic signals. Because different manufacturers and often different electronic devices made by the same manufacturer use different command signal structures, the original remote control that comes with the electronic device generally cannot be used to control a different electronic device. To solve that problem, various types of so-called universal remote controllers have been made to control several electronic devices using only one remote controller. These universal remote controllers are either a learning type or a preset type, or a combination of these two types. A learning remote controller can learn and remember the proper individual command signals from an original remote control unit. A preset universal remote controller has a memory to store a manufacturer selected collection of different signal structures. Each signal structure corresponds to a specific electronic device and is associated with a special code. The user can select a desirable signal structure by entering the corresponding special code. The combination type universal remote controllers have both the learning and the preset feature. For example, the remote controller may have a collection of preset signal structures stored in its memory, but the remote controller automatically recognizes a special code associated with a specific signal structure when the remote controller learns a command signal from another remote controller. The advantage oft his type of remote controller is that they do not require manual selection or entrance of the device code by the user.

A universal remote control therefore helps to solve a problem caused by the variety electronic devices and lack of compatibility among them. The users of remote controllers, however, face another problem caused by the variety and complexity of the content and programming available through electronic devices. For example, a television may be capable of receiving hundreds of programming channels through cable or satellite. Multiple channel programming offers rich content to the end users but also makes selecting desired programs more and more difficult, especially so when the selection is made using a remote controller.

As an illustration, consider a television set owned by a family of several members. The television set is capable of receiving more than a hundred different channels, each channel having a unique channel identifier, such as a unique channel number consisting of one or several digits. The channels can be selected either on the television set or on a remote controller, but more typically on the latter. The remote controller has a set of command keys including a group of numeric keys such as 0–9. To select a specific channel, the user presses the corresponding channel number on the numeric keys on the remote controller. The remote controller usually also has channel shifting keys such as a CHANNEL UP key and a CHANNEL DOWN key that can be used to switch channels without entering the specific numeric code. In this setting, the difficulty of selecting channels comes at different conflict levels.

First, some of the channels may be empty, i.e., do not carry any program signal at the place where the family lives or in the service to which the family has subscribed. To avoid facing empty displays or the "snowing screens", the television set must be scanned and indexed to skip these empty channels. Most television sets have a scanning and indexing function built in. When indexed, operations of the CHANNEL UP key and the CHANNEL DOWN key shift the working channel from the present channel to the next indexed channel but skip the non-indexed channels. These unindexed channels can be accessed only by entering their corresponding numeric code on the remote controller.

Second if a large number of channels are indexed, another problem occurs. A certain member of the family may watch only a few channels among the indexed channels. For this family member, it is inefficient to find his or her favorite channels by going through the entire set of the indexed channels using the CHANNEL UP key and the CHANNEL DOWN key. To quickly access the favorite channels, the person may have to memorize the specific numeric codes for each of the favorite channels, a task which is not always easy given the large number of channels available.

Third, even if the person manages to memorize the numeric codes of the favorite channels, it is still cumbersome to enter the numeric codes on the remote control because very often each code involves multiple digits. In this case, not only does pressing multiple keys one at a time itself takes longer time than pressing a single key, but also it is not always intuitive to locate the next numeric key on the keyboard of the remote controller.

Finally, with more and more electronic devices being used and more and more programs and channels being made available, the remote controllers are becoming progressively complicated and difficult to learn and use. This may be a blessing for people who are gadget oriented but an inconvenience or an obstacle for the less tech-minded. In addition, certain groups of people may find an ordinary remote controller available today simply too overwhelmingly difficult to use, either because of their age or disabilities. From another point of view, some people who are capable of learning how to use a more complicated remote controller may prefer a simplified remote controller anyway simply because of their lifestyles.

To solve the above problems, some remote controllers use favorite channel keys. The Weemote™ made by Fobis Technologies Inc., for example, has several favorite keys. Each favorite key can be programmed as the unique access key for a favorite channel so that when the favored key is pressed the remote controller transmits the unique channel identifier code to the television and switches the channel to the associated favorite channel. To program the favorite key on a Weemote™, the user must know the unique channel number of the favorite channel and enter that number correctly during programming. This still has several problems. First, it is not always easy to remember channel numbers which often have two or even three digits. Second, a viewer usually chooses a favorite channel based on program content that he sees on the screen and often does so with no knowledge of or pays no attention to the actual channel number he is choosing. Third, even if the person knows the favorite channel numbers, entering such numbers on the remote control keyboard may still be found an undesirable task to perform (even if it is required only during programming). Fourth, such remote controllers must have a set of numeric keys to facilitate the entries of channel numbers as channel identifiers, making the remote controller bulky and complicated, a problem further discussed below.

Conventional remote controllers usually have a complete numeric keyboard including numeric keys 0–9 or more. These numeric keys tend to make layout crowded and complicated. They also mandate a larger size of the remote controller to implement the keys. In an attempt to solve this problem, the Weemote™ provides a special way of entering channel numbers. Instead of requiring a full numeric keyboard for the 0–9 keys, the Weemote™ has only three numeric keys, specifically "100", "10", and "1". To further improve the appearance of the remote controller, the above three numeric keys are located on the back of the remote controller under a cover. The simplified numeric keyboard, however, comes at a price of more complicated entering process. For example, to enter channel 189, instead of pressing the key "1" once, the key "8" once and the key "9" once the user must press the key "100" once, the key "10" eight times and the key "1" nine times. In view of this, it is desirable to have a remote controller that doesn't require numeric keys for entering channel numbers. Such remote controllers would not only be less complicated but also have a less cluttered appearance.

There is therefore a need to make a remote controller that is straightforward in appearance and simple to use. There is a parallel need to make a remote controller that has one or more favorite keys that can be easily programmed to give quick access to the user's favorite channels without requiring memorizing or knowing a channel identifier. There is yet another parallel need to make a remote controller that does not have numeric input keys in addition to the favorite keys.

Using programmable favorite keys to quickly access a favorite channel is not new. U.S. Pat. Nos. 4,959,810 and 5,414,426, for example, disclose MACRO keys that can be programmed to directly access a favorite channel. The difference between these MACRO keys and the programmable favorite keys according to the present invention will be clear once the invention is described in comparison with the prior art.

In principle, in order to program a favorite key, the favorite channel must first be identified. The channel identifying information or a channel identifier must then be conveyed and assigned to a designated favorite key to program the key for the favorite channel. In the prior art, channel identifiers used to identify favorite channels are in a sense "absolute identifiers". A channel number, for example, is in a sense absolute because it is unique and fixed for the corresponding channel given the local network programming in the case of a television set. Correspondingly, once a channel identifier is conveyed and assigned to a designated favorites channel, the infrared or electromagnetic command signal generated to activate a particular channel is also specifically programmed to have the required frequency, duration and other aspects of the signal pattern to directly activate the corresponding favorite channel. As long as a channel is identified by an absolute identifier only, such absolute identifier must be entered and assigned to the designated favorite key in order to program the favorite key. In the existing technology, the communication between a remote controller and a home electronic device is mostly a one-way communication going from the remote controller to the electronic device. Specifically, only the remote controller transmits command signals to the electronic device, not vice versa. In the present example, although the controlled electronic device itself may readily have the absolute channel identifying information of a present channel, it does not actively convey such channel identifying information to the remote controller. As a result, the user must first have knowledge of the channel identifying information and then enter the information into the remote controller. Due to the above intrinsic requirements, as long as the channels are identified by absolute channel identifiers only, both the user knowledge of the channel identifying information and input means on the remote controller to enter such information are necessary elements for remote controllers that employ programmable favorite keys. Any further simplification to omit these elements would require a breakthrough in conferring a new way of identifying favorite channels.

BRIEF SUMMARY OF THE INVENTION

The present invention is a remote controller that has at least one favorite key, which when programmed allows direct access to the corresponding favorite channel without requiring the user to enter the actual channel number of the favorite channel. In programming the favorite key, an index number representing a relative index position of a channel, rather than an absolute channel identifier such as a channel number, is used to identify a corresponding favorite channel. As a result, not only can the user access a favorite channel quickly and directly by pressing a favorite key, the user can easily program favorite key without having the knowledge of absolute channel identifying information such as channel numbers or having to enter such information on the remote controller.

In one embodiment of the present invention, only the relative position of a favorite channel in a set of indexed channels on the controlled electronic device is required to program a favorite key. The relative position of a favorite channel is defined in relation to a predetermined base channel and is represented by an index number and it can be easily determined.

In one embodiment of the present invention, the process is further simplified by a program in the remote controller allowing the index number of a favorite channel to be determined automatically when the user scans through the set of indexed channels to locate the favorite channel. The very act of locating a favorite channel on the target electronic device using the remote controller generates the necessary information to determine the index number of the favorite channel. After determining the index number of the favorite channel, the program assigns the information of such index number to the corresponding favorite key.

DETAILED DESCRIPTION OF THE INVENTION

Figure 1:
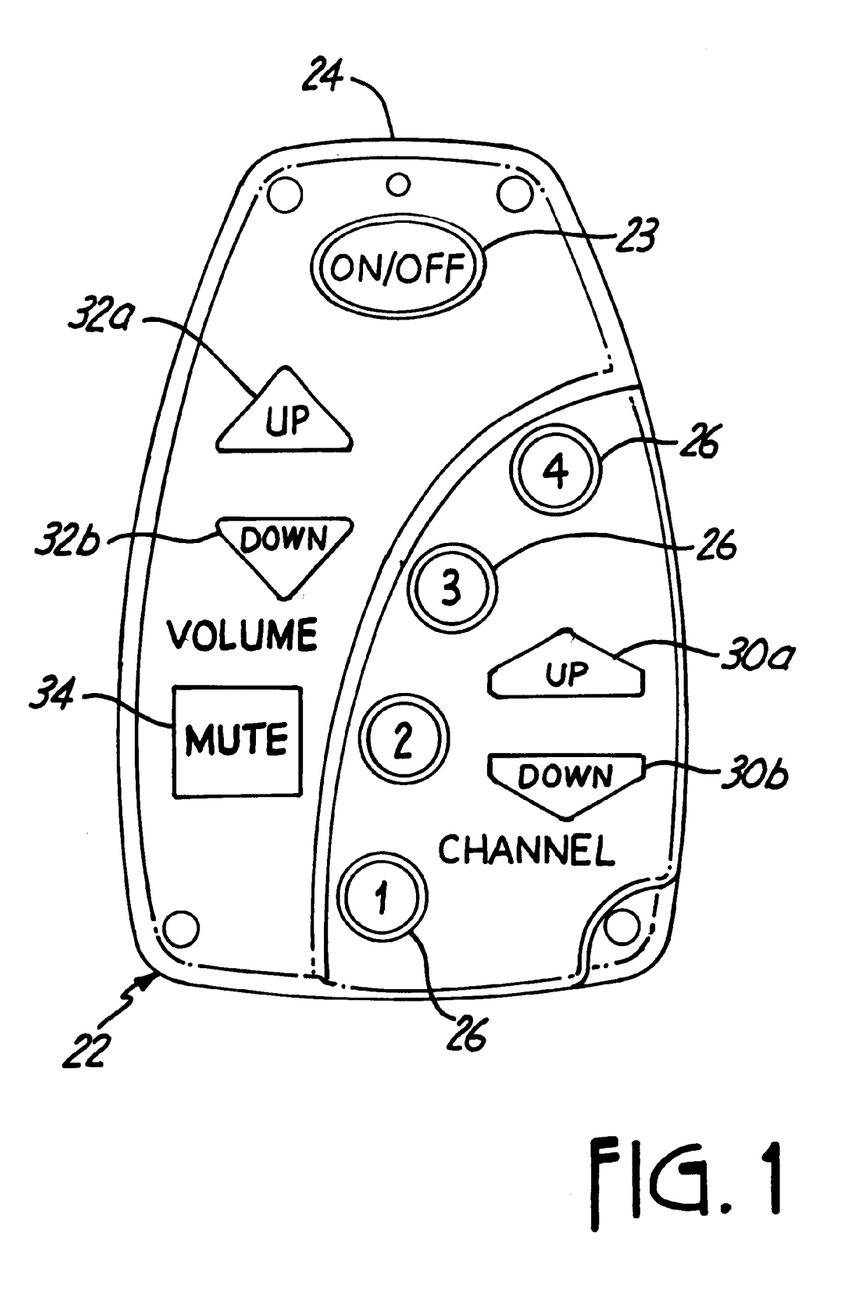
FIG. 1 shows the appearance of a remote controller of an embodiment of the present invention.

FIG. 1 shows a remote controller 20 in accordance with the present invention. The remote-controller 20 has a outer housing 22, a command signal transmitter 24 (such as an infrared lamp), a group of favorite keys 26, and a set of regular command keys such as a POWER ON/OFF 28, a CHANNEL UP 30a, CHANNEL DOWN 30b, VOLUME UP 32a, VOLUME DOWN 32b and MUTE 34. Except for the favorite keys 26, which will be described in detail later in this application, the basic functions of the other keys are self explanatory according to their names. In general, each regular command key 28, 30a, 30b, 32a, 32b, or 34, when operated in a normal mode causes predetermined control signals to be transmitted to an electronic device (not shown) to execute respective operations of the electronic device. As illustrated later in this specification, however, these regular command keys may also be preprogrammed by the manufacturer to perform certain user programming functions when operated in a special manner (such as being held down for a prolonged period of time).

Figure 2:
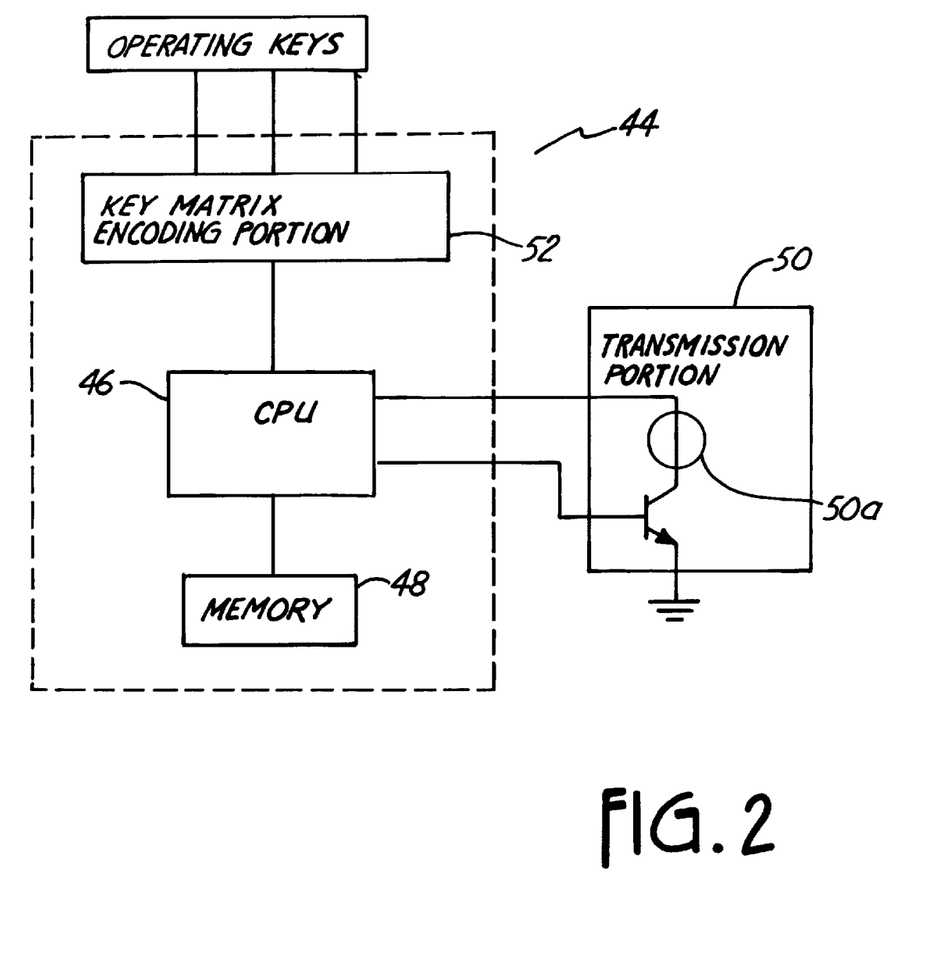
FIG. 2 is a block electrical schematic circuit diagram of the remote controller shown in FIG. 1.

FIG. 2 shows a block electrical schematic circuit diagram of the remote controller shown in FIG. 1. According to the block diagram, the remote controller 20 comprises a microprocessing unit 44 including a central processing unit (CPU) 46 and a memory 48; operating keys including a set of regular command keys 28, 30a, 30b, 32a, 32b, or 34 and one or more programmable favorite key 26; a transmissions circuitry 50 coupled to the microprocessing unit 44; command codes (not shown) stored in the memory 48 for creating corresponding command signals which are transmitted by the transmission circuitry 50 to a controlled electronic device (not shown) to cause the controlled electronic device to perform specific command functions; and a program (not shown) stored in the memory 8 to accomplish the programming of the programmable favorite keys 26.

All operating keys, including regular command keys (28,30a, 30b, 32a, 32b, or 34) and the programmable favorite keys 26, are coupled to the microprocessing unit 44 through a key matrix encoding means 52. The microprocessing unit 44 itself includes a memory 48, which is either a random access memory (RAM), a read only memory (ROM), or a combination of both. The memory 48 stores the signal codes used by the microprocessing unit 44 to control the transmission circuitry 50 such as an infrared photo diode 50a to generate and transmit command signals. Each signal code corresponds to a specific command signal. When a signal code is assigned to a control key, pressing that control key sends the corresponding command signal to the controlled electronic device. When the remote controller 20 is set to control a certain electronic device, each regular control key other than the programmable favorite keys 26 has a fixed corresponding signal code. In this respect, the programmable favorite keys 26 are different.

In one embodiment, each programmable favorite key 26 is pre-programmed (or manufacturer programmed) to have the signal code for a channel shifting command. The favorite key 26, however, does not just transmit a single channel shifting command when operated but is programmed to transmit a channel shifting command signal n times, where variable n is an integral equal or greater than zero and is subject to change through user programming. Because the characteristic of the signal is always channel shifting regardless of the value of variable n, the normal operational function of a favorite key 26 is always to access a user selected channel rather than to perform other operations such as VOLUME UP/DOWN. Therefore, the programmable favorite keys 26 according to the present invention are different from conventional MACRO keys such as those disclosed in U.S. Pat. Nos. 4,959,810 and 5,414,426. The conventional MACRO keys are not pre-linked to any command code but must be entirely programmed by assigning to it a sequence of commands to perform. More importantly, the conventional MACRO keys are incapable of being programmed to access a user selected favorite channel unless an absolute channel identifier is supplied. That is so because even though a conventional MACRO key may be programmed to transmit the sequence of channel shifting command signals, there is no provision in the prior art to determine the actual number of channel shifting command signals needed to switch the channel to the user selected favorite channel. In contrast, according to the present invention variable n is determined in user programming based on relative index positions of the indexed channels. Various concepts and methods for programming are involved. An explanation for these concepts and methods follows.

1. The Concept of Index Numbers of Indexed Channels

Electronic devices usually have a set of indexed channels, i.e., active channels. The other channels are not included in this set of index channels either because they are not available or intentionally unselected by the user. The indexed channels on an electronic device are usually lined up sequentially in a chain. The chain often forms a circle in which the ending channel is connected to the starting channel. In the chain of indexed channels, each channel may be given an index number to describe the relative location of the channel on the chain.

In order to determine the index number of the favorite channel and subsequently program a favorite key 26 according to the index number, a base channel must first be chosen. Once the base channel has been chosen, the index number of an indexed channel may be readily determined by the number of steps the channel is stepped from the base channel.

For example, if the set of indexed channels includes channels 2, 4, 5, 9, 11, 15, 24, 27, 35, 42 and 45, and channel 2 is selected as the base channel, the index number of channel 4 may be designated as +1 because it is one step up from the base channel. Similarly, the respective index numbers of channels 5, 9, 11, 15, 24, 27, 35, 42 and 45 are +2, +3, +4, +5, +6, +7, +8, +9 and +10. Alternatively, because the chain of indexed channels has two opposite directions, the respective index numbers of channels 45, 42, 35, 27, 24, 15, 11, 9, 5, and 4 may be designated as −1, −2, −3, −4, −5, −6, −7, −8, −9 and −10. Alternatively, the index channels maybe divided into two groups with the first group being closer to the base channel in the upward direction and the second group closer to the base channel in a downward direction; In this case, the index numbers of the first group may be designated in terms of+steps while the index numbers of the second group may be designated in terms of −steps. For example, the first group may include channels 4, 5, 9, 11, and 15 with their respective index numbers being +1, +2, +3, +4 and +5, while the second group may include channels 24, 27, 35, 42 and 45 with their respective index numbers being −5, −4, −3, −2 and −1. Regardless of which of the above alternatives is used, the index number of the base channel chosen (channel 2 in the instant case) is always 0.

When a different base channel is selected, each channel's index number may be different. For this reason, the index numbers of the indexed channels are relative channel identifiers because these numbers are not absolute in a sense that they change as a different base channel is selected. In addition, even if the base channel is fixed, there is no determinative relation between the index number of a channel and the original channel number of that channel. For example, in the above illustration the index number of channel 9 is a +3 when the base channel is channel 2. However, if the additional channel such as channel 7 is added to the present set of indexed channels, the index number of channel 9 will become +4 even though the base channel is still channel 2.

Although the index number of the index channel is a relative channel identifier, it provides accurate information on how to get to the channel from the base channel. Electronic devices usually have channel shifting keys such as a CHANNEL UP key 30a or a CHANNEL DOWN key 30b to shift the channel from one to another. When a channel shifting key is pressed, the channel transitions from the present channel to the next one in the corresponding direction. The index number of a target channel therefore defines both the transition distance and the transition direction to precisely move from the base channel to the target channel sought by the user.

In theory, any channel in the set of the indexed channels may be chosen as the base channel. In the preferred embodiment, however, a manufacturer presets the base channel because otherwise the user would be required to select a base channel and to further enter that user choice on the remote controller 20. Although availability of a user option may be a desirable feature, one embodiment of the present invention is aimed at simplicity of use and elegance in appearance, and hence the user selectable base channel may make the use of the remote controller 20 unnecessarily complicated.

A drawback of a fixed manufacturer preset base channel is that the base channel may be an unindexed channel or even an empty channel. Although in this situation the remote controller 20 according to the present invention will still work, the user is faced with a minor annoyance of having to see, albeit briefly, the target electronic device switching into an undesired channel or an empty channel each time the channel resetting signal is transmitted upon pressing a favorite key 26. As a partial solution, there may be provided several user-selectable base channels and let the user make a selection by quickly toggling or shifting the key or switch.

Preferably, such a switch should be located on the back of the remote controller 20 to avoid cluttering the appearance of the remote controller 20. The user may ignore such a switch but still have a fully functional remote controller 20. The switch is therefore an option available to a user who desires more adjustability, but does not affect users who ignore it.

2. Determining the Index Numbers of Indexed Channels

A method for determining the index number of a favorite channel will now be described in details with reference to FIG. 1 and a part of the flowchart in FIG. 3.

In theory, the user can determine the index number of a favorite channel by manually counting the steps the channel is moved from the base channel. This is not only a cumbersome task for many in itself, but it also would require the user to communicate the information of the determined index number to the remote controller 20 in order to carry out programming.

According to the present invention, there is provided a program in the remote controller 20 to intrinsically determine the index number of a favorite channel as the user shifts channels up and down to find a favorite channel.

The remote controller 20 has a set of command keys including one or more channel shifting keys such as a CHANNEL UP key 30a and/or CHANNEL DOWN key 30b. The remote controller 20 further has a counting program which counts the number of times the channel shifting keys have been operated since the counting was started or since a particular variable related to the counting was reset to zero. When channel shifting keys of the opposite directions are involved, the counting program takes the shifting direction into consideration and modulates the count with either a positive sign or a negative sign depending on the channel shift direction of the key operated. At any point of time during counting, the algebraic sum of the number of operations performed on the channel shifting keys is a variable n defining an index number of the present channel relative to the initial channel when the counting started. If the counting for variable n started with the initial channel being the predetermined base channel, the variable represents the index number i of the present channel relative to the base channel.

The above method for determining the index number of an indexed channel is further illustrated with reference to a part of the flowchart in FIG. 3. FIG. 3 is a complete flowchart to show how an embodiment of remote controller 20 according to the present invention works. In the embodiment according to FIG. 3, index numbers of user selected favorite channels are determined in a special programming mode in step S204 which is further detailed as steps S102 through S107. When the user switches the remote controller 20 to the programming mode (S101), the remote controller 20 transmits a command signal to switch the electronic device to the predetermined base channel (S102). The user then uses a channel shifting key or channel shifting keys to find a favorite channel.

Preferably, the channel shifting keys include both a CHANNEL UP key 30a and a CHANNEL DOWN key 30b. The operations of the CHANNEL UP key 30a and/or the CHANNEL DOWN key 30b will control the electronic device to go through the indexed (i.e., active) channels but will skip the unindexed (i.e., inactive) channels. Upon entering the programming mode for programming a selected favorite key (S202, S203), the channel is reset to a predetermined base channel (S102). The counter starts to count from zero the number of times CHANNEL UP key 30a and/or the CHANNEL DOWN key 30b are operated (S103–S107). The counter counts ups or downs, or the net of ups and downs. For example, if the set of indexed channels includes channels 2, 4, 5, 9, 11, 15, 24, 27, 35, 42 and 45, and channel 2 is selected as the base channel, as the user moves from the base channel 2 to a favorite channel 11 by pressing the CHANNEL UP key 30a four times, the counter will count four times. If the user makes a mistake and passes channel 11 to go to channel 15 by pressing the CHANNEL UP key 30a to five times but then comes back to channel 11 by pressing the CHANNEL DOWN key 30b once, the counter will count 5−1=4, still reaching the correct index number of channel 11. The counter therefore determines the index number of a favorite channel automatically as the user switches channels to find the favorite channel. This makes the determination of index numbers easier and faster. In addition, because the counter can store the counted number in a memory 48, it can automatically assign the determined index number to the favorite key 26 being programmed. There is therefore no need for the user to communicate such information to the remote controller 20.

Although it is possible that a functional remote controller 20 according to the present invention may include only one channel shifting key, such as the CHANNEL UP key 30a or the CHANNEL DOWN key 30b, it is preferred to have both the CHANNEL UP key 30a and the CHANNEL DOWN key 30b.

Preferably, the counter counts the number of operations on the CHANNEL UP key 30a and the CHANNEL DOWN key 30b only but not the operations on other keys. With this arrangement, the user may pause during his programming for a favorite channel to perform other operations such as volume down and volume up on the remote controller 20 without affecting a correct counting. As a related consideration, the user may stop in the middle of a process of programming to do other things. It is therefore preferable to have a memory retention feature to retain the result of counting for a certain period of time during programming. This period of memory retention, however, should not be too long, for the user may forget the programming and come back later to start to operate the remote controller 20 mistakenly thinking that it is in the normal operating mode. In this situation, the user may have unintentionally changed the settings of a favorite key 26 due to a partial counting. In light of this, it is preferable that the remote controller 20 is programmed to abandon a programming process without saving the data after a certain period of idle time. Due to the above competing factors, a preferable memory retaining time is about 15 minutes.

3. Programming Favorite Keys 26

Once the index number of a selected favorite channel is determined, the information can be used to program the favorite key 26.

Preferably, the remote controller 20 has an operating mode and a programming mode. As described later in the present application, despite the designations of an operating mode and a programming mode, certain necessary programming is carried out in the operating mode rather than in the programming mode. However, certain special programming is always carried out in the programming mode.

Figure 3A:
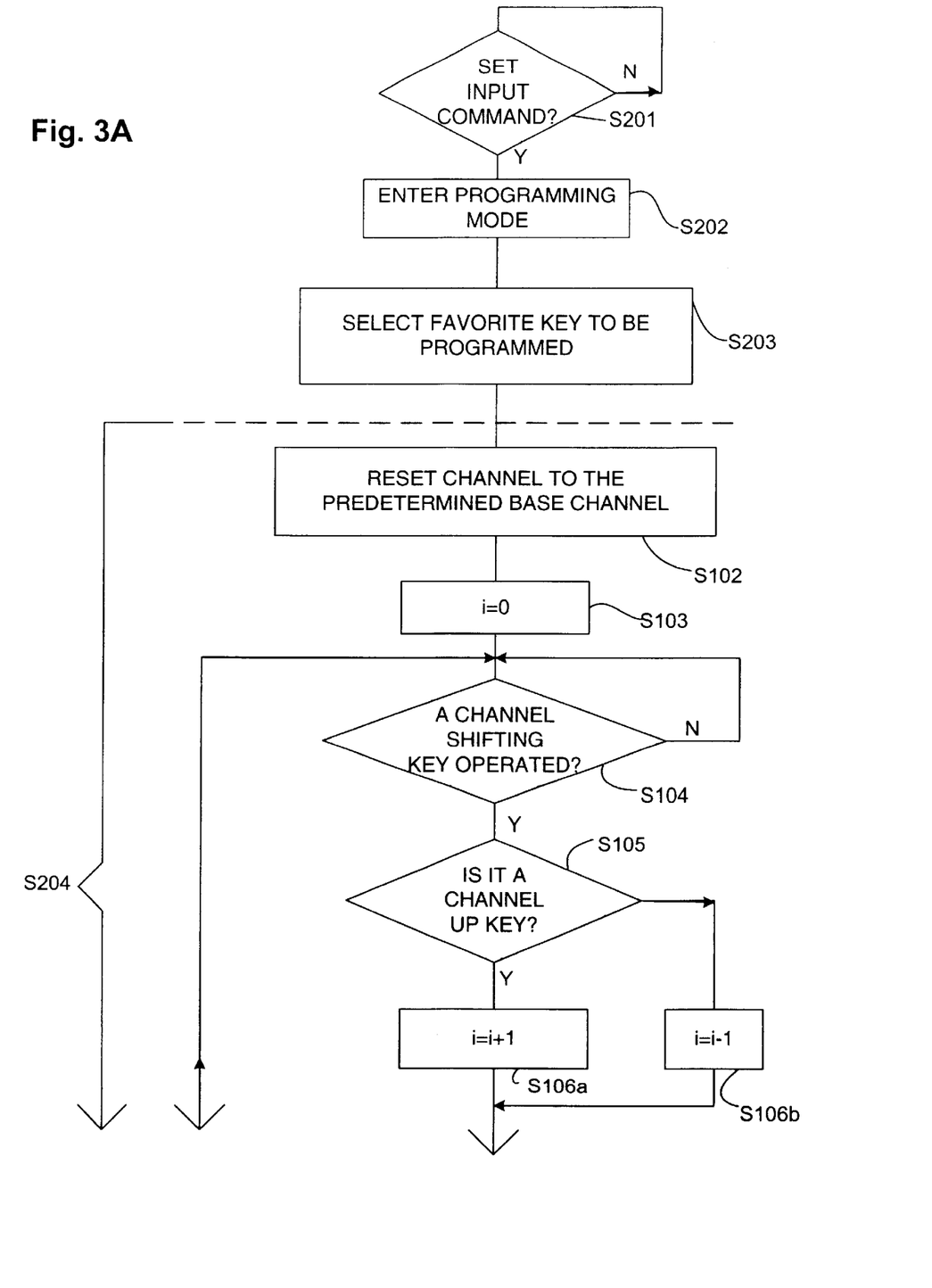
FIG. 3 is a flowchart for programming a favorite key and subsequently using the favorite key.
Figure 3B:
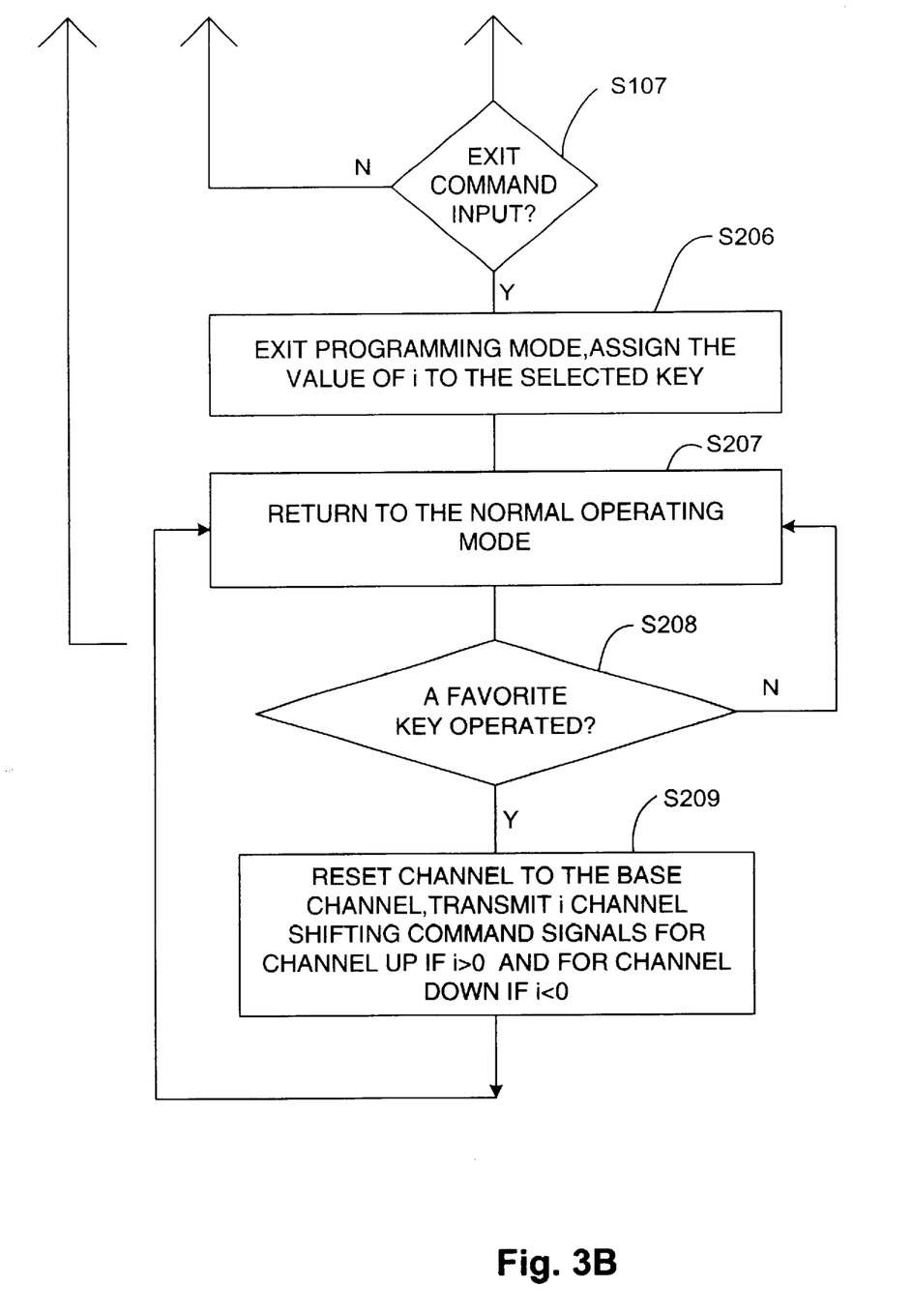

The flowchart in FIG. 3 illustrates a method of programming a remote controller 20 having a plurality of keys to control a target electronic device, wherein the method comprises the steps of: 1) entering the programing mode (S201 and S202); 2) selecting a favorite key to be programmed (S203); 3) determining the index number i of a favorite channel in a plurality of indexed channels (S204, which is further detailed in S102 through S107 as described previously); 4) assigning the index number i of the favorite channel to the selected programmable favorite key and exiting the programing mode (S206).

As shown in FIG. 1, the remote controller 20 may have a plurality of favorite keys 26. Each favorite key 26 can be individually programmed to give quick access to a users favorite channel. In this case, the remote controller 20 also has a program to facilitate the selection of the favorite key 26 needs to be programmed. This can be accomplished either as the integral part of the operation to enter programming mode or as the separate operation executed either before or after entering the programming mode. For example, each favorite key 26 can be programmed such that when a favorite key 26 is held down continuously for a predetermined period of time (e.g., 3 seconds or longer) the remote controller 20 enters into a programming mode for programming that particular favorite key 26. The advantage of such an arrangement is that it is easy and fast. The disadvantage, however, is that it increases the likelihood of accidentally erasing the program favorite key 26 functions by the user. Alternatively, a special key such as the MUTE key is programmed such that when that key is held down continuously for predetermined period of time (e.g., 3 seconds or longer) the remote controller 20 and is into the general programming mode. The user separately chooses which favorite to be programmed by simply pressing that particular key.

Once the remote controller 20 enters the programming mode for programming a selected favorite key 26, the user may program the selected favorite key 26 for a favorite channel that the user chooses. The program for programming a favorite key 26 is now described in detail.

It is an important feature of the present invention that favorite keys 26 are programmed to transmit relative channel shifting command signals such as CHANNEL UP command or CHANNEL DOWN command, rather than to transmit absolute channel shifting command signals such as specific channel numbers. Specifically, each favorite key 26 is preprogrammed to transmit a command signal code in the form of a string of k signals for CHANNEL UP command or CHANNEL DOWN command, where the variable k is the transition distance from a reference channel to the favorite channel. The transition distance k is determined by the index number i of the favorite channel and the index number j of the reference channel according to the following the equation:

$$k=i-j$$

For example, if the index number of the favorite channel is +5 and the index number of the reference channel is +3, the transition distance from the reference channel to the favorite channel is 5−3=+2. Correspondingly, the associated favorite key 26 is programmed to transmit a command signal comprising two CHANNEL UP signals. As a result, when the electronic device is presently on the reference channel, a single operation on the favorite key 26 shifts the channel from the referenced channel to the favorite channel.

Completely programming a favorite key 26 therefore generally requires the knowledge of two variables: the index number i of the associated favorite channel and the index number j of the reference channel. Various embodiments of programming methods are discussed below.

In one embodiment according to the flowchart in FIG. 3, the reference channel is programmed to be a fixed channel, preferably the same as the predetermined base channel itself. In this embodiment, the index number j of the reference channel is a known constant. For example, in the case of the base channel itself being used as the reference channel, the index number j of the reference channel is always zero. This gives k=i−j=i−0=i. Therefore, programming of a favorite key 26 requires only the knowledge of the index number i of the associated favorite channel. As a result programming of a favorite key 26 can be accomplished at the same time as the index number of the associated favorite key 26 is determined. This is preferably accomplished in a special programming mode so that after the programming is finished, the remote controller 20 is switched to an operating mode and the programmed information associated with the programmed favorite key 26 may be retained until the user chooses to reprogram the favorite key 26 later.

Upon leaving the programming mode and entering the normal operating mode (S207), the favorite key 26 is programmed to transmit a sequential string of command signals comprising: 1) an initial command signal which switches the working channel on the controlled electronic device to the predetermined base channel, and 2) k subsequent channel shifting command signals to shift the working channel on the controlled electronic device from the predetermined based channel to a favorite channel associated with the favorite key 26. The number k is the same as the index number i of the favorite channel relative to the predetermined base channel. This number is retained by the favorite key 26 until the user reprograms the favorite key 26.

A favorite key 26 SO programmed operates to directly access the associated favorite channel in the operating mode. In order for the programmed favorite key 26 to work properly, the electronic device must be on the reference channel before the series of channel shifting signals are transmitted. In this embodiment, the favorite key 26 first transmits a channel resetting command signal before the transmission of the channel shifting signals (S209). The channel resetting command signal resets the channel to a predetermined reference channel, preferably the same as the predetermined base channel. When the favorite key 26 is pressed, the channel resetting command signal is first transmitted. Upon receiving this signal, the electronic device (e.g., a television set) changes its operating channel to the reference channel. Subsequently, a series of channel shifting command signals are transmitted to shift the operating channel to the user favorite channel (S209).

For example, if the index number of a selected channel is −2, upon exiting the programming mode, the program outputs the number −2 and assigns it to variable n associated with the programmed favorite key 26. Consequently, the favorite key 26 now has an operational command signal which comprises a channel resetting signal and a string of two signals for CHANNEL DOWN command. An operation on the favorite key 26 will shift the operating channel to the user favorite channel which has an index number of −2.

In another embodiment, however, instead of using a fixed reference channel (i.e., the initial channel), a floating reference channel is used. As previously discussed, the transition distance n from the reference channel to the favorite channel is determined according to k=i−j, where i is the index number of the favorite channel and j is the index number of the reference channel. Both index numbers i and j are determined relative to a predetermined base channel. Given both the index numbers i and j, the number of channel shifting command signals need to be transmitted by the favorite key 26 in order to shift the channel from the reference channel to the favorite channel may be readily determined. For example, if the index number of the present channel (reference channel) is +7 relative to the base channel, and the index number of the favorite channel the user wants to access next is +6, it can be readily determined that the associated favorite key 26 should be programmed to transmit one CHANNEL DOWN command signal in order to shift from the present channel to the favorite channel.

Preferably, the floating reference channel is whichever channel the electronic device is on at the time the user presses the favorite key 26. Choosing a real-time present channel as the reference channel has the advantage of not requiring the favorite key 26 to be programmed to transmit a channel resetting signal in addition to a string of channel shifting signals. For example, if it is determined that the desired favorite channel is −1 transitions away from the present channel, the corresponding favorite key 26 needs to only transmit one CHANNEL DOWN signal without first resetting the channel to the base channel.

To program a favorite key 26 according to the above embodiment, the knowledge of the index number of the present channel is necessary. Without such knowledge, there is no foundation to determine the number of channel shifting command signals needed to be transmitted by the favorite key 26. With reference to FIG. 3, this embodiment is the same as the previous embodiment from steps S201–S207 but different in the subsequent operating mode. On one hand, a predetermined base channel is also used for determining index numbers of both favorite channels and a present channel; the remote controller 20 also has an operating mode and a programming mode; the index number i of a selected favorite channel is determined in the programming mode according to the same method in the previous embodiment in which a fixed channel such as the predetermined base channel is used as the reference channel (see S201–S204 in FIG. 3); and upon exiting the programming mode, the number i is assigned to the associated favorite key 26 and retained until the user chooses to reprogram the favorite key 26 later (S205–S207). On the other hand, in this embodiment the favorite key 26 is only partially programmed in the programming mode. After exiting the programming mode, the program of remote controller 20 must further determine another variable, namely the index number j of the floating preference channel, to finally determine the number of channel shifting signals need to be transmitted by the favorite key 26.

Figure 4:
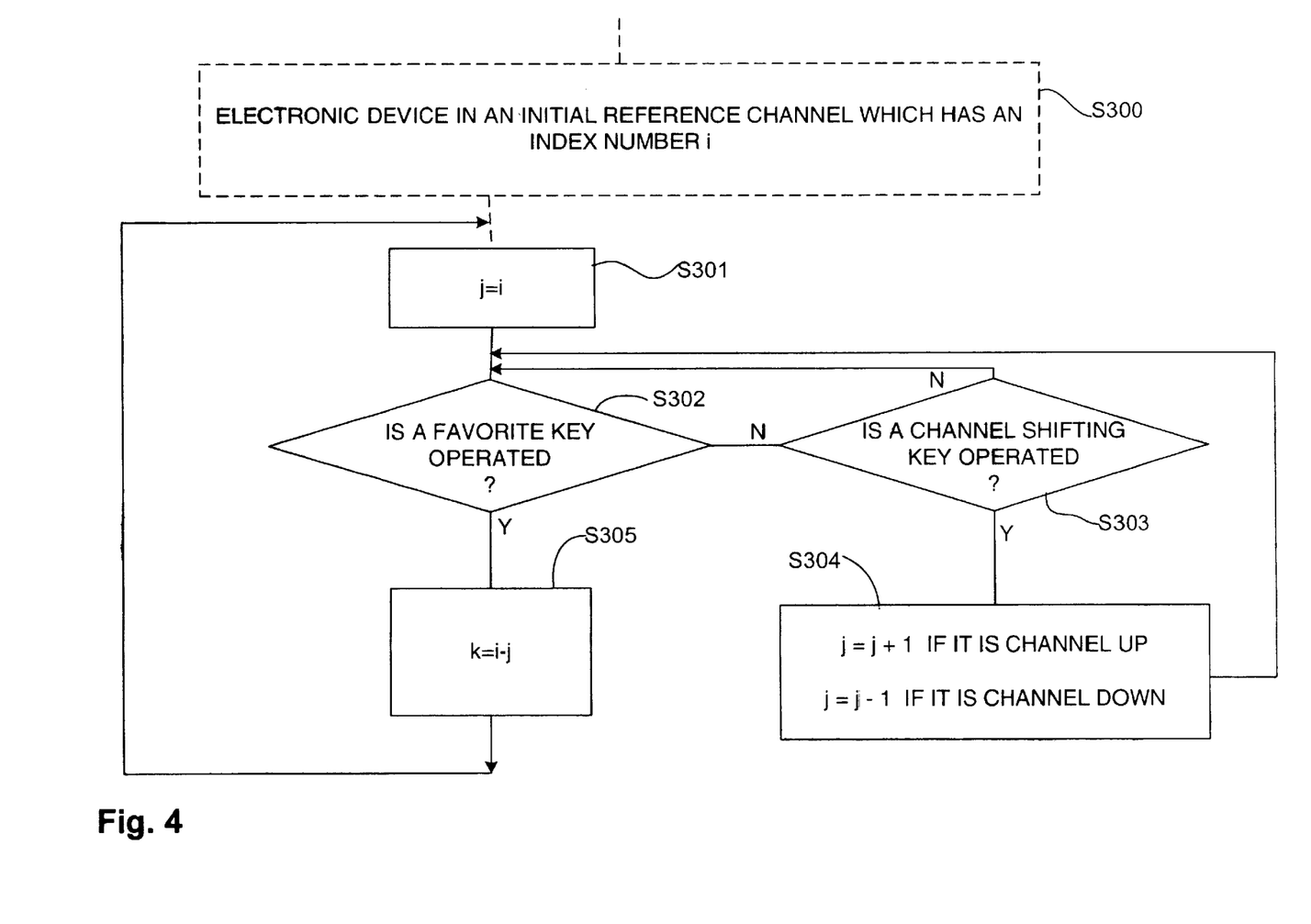
FIG. 4 is a flowchart for determining in real-time the index number of a present channel in the normal operating mode.

A method for determining the index number of a present channel is now described with reference to the flowchart in FIG. 4.

The index number j of a present channel is determined in real time in the operating mode. To study the flowchart in FIG. 4, it is to be understood that i, j and k designate variables and therefore using the same letter designation in different context does not suggest that the same specific value of the variables is involved. The flowchart in FIG. 4 starts with an initial status S300 in which the remote controller 20 is in the normal operating mode and the controlled electronic device in a programmed favorite channel (hereinafter "the first favorite channel").

In the simplest situation, the user next presses another favorite key 26 in order to shift the channel from the first favorite channel to a different favorite channel (hereinafter "the next favorite channel"). In this situation, the first favorite channel is the reference channel. Because the information on the index number of a programmed favorite channel is stored in a memory 48 of the remote controller 20, the index number j of the reference channel is available and is the same as the index number of the first favorite channel (S301). Assuming the next favorite channel has been previously programmed and has a different index number i, the effective signal sequence for the favorite key 26 to shift from the first favorite channel to the next favorite channel is simply k=i−j channel shifting signals (S305). Note that the values of both i and j are internally available and does not require input by the user. With such information available, the remote controller 20 can to determine the effective signal sequence of a favorite key 26 in real time when the favored key is pressed.

In a slightly more complicated scenario, the user, starting from the first favorite channel, subsequently shifts channels using the channel shifted keys to reach a present channel immediately before the user presses another favorite key 26 to access the next favorite channel. In this situation, the present channel (reference channel) may or may not be a favorite channel and its index number j is not directly available in the memory 48. It is however simple to calculate that index number j according to a method described next still with reference to the flowchart in FIG. 4.

The program in the remote controller 20 remembers the index number i of the last favorite channel accessed by operating the associated favorite key 26 and temporarily assigns that value to the index number j of the reference channel (S301). The counter in the remote controller 20 works in the operating mode in order to determine the final value of j (S303, S304). Specifically, if the user subsequently shifted channels using the channel shifting keys, the program counts the number of times and the directions channel shifting keys were operated. Combining this information with the index number of the last favorite channel accessed, the program determines in real time the index number j of the present channel. For example, if the last favorite channel accessed by the user has an index number of +2, the user has since shifted channel four times by pressing CHANNEL UP key 30a three times and CHANNEL DOWN key 30b once, the index number of the present channel is determined as follows: (+2)+(+3)+(−1)=+4. This determination is performed in a normal operating mode rather than in a special programming mode such as one in which favorite keys 26 are programmed.

With the index number j of the reference channel determined, as the user next presses a favorite key which has the associated index number i, the number of channel shifting command signals to be transmitted is determined by k=i−j. See steps S302 and S305.

It is important to note that in the above embodiment, although the counter works both in the programming mode and the operational mode, there is an essential difference in the manner the counter works in these two different modes. In the former, it counts for a variable n that is to be assigned to a favorite key 26 and semi-permanently remains associated with the favorite key 26 until the user reprograms that key, while in the latter the counter counts a transient number which is used for determining a variable k for the signal pattern of the favorite key 26 presently being operated. The variable k itself is also a transient number. After the command signals are transmitted, the number does not remain associated with the favorite key 26, but will be determined anew each time when a favorite key is operated in the operating mode.

A relative disadvantage of the above embodiment is that if the user has changed the channel using keys other than the channel shifted keys or favorite keys 26 (for example, by entering a specific channel number), the program may determine an incorrect index number of the present channel. However, in the embodiment in which the remote controller 20 does not have a regular numeric key and the channel can be shifted or changed only by the operating a channel shifting key 30a or 30b, or a favorite key 26, the above problem is unlikely to occur.

In yet another embodiment, the combination of a fixed reference channel and a floating reference channel is used. Specifically, the reference channel is selected from either the predetermined base channel or the present channel depending on the transition distance from these two channels to the favorite channel. The method can be illustrated in the following example. Suppose the index number of the present channel is +7 relative to the base channel, and the index number of the favorite channel the user wants to access next is +6 relative to the base channel. In this case, if the base channel is selected as the reference channel, the favorite key 26 associated with the above average channel will need to be programmed to transmit a channel resetting signals first and six CHANNEL UP signals next. By contrast, if the present channel is selected as the reference channel, the favorite key 26 will only need to be programmed to transmit one CHANNEL DOWN command signal. This simplifies the signal sequence of the favorite keys 26. An opposite situation may occur in which using that base channel as the reference channel result in a sequence of command signals for the favorite key 26. The remote controller 20 can be programmed to optimize a favorite key 26 to suit for an instant need each time the favorite key 26 is operated.

In all above-described embodiments, the use of relative channel shifting command signals such as CHANNEL UP command or CHANNEL DOWN command makes it possible to program favorite keys 26 without the user's knowledge of absolute channel identifying information such as specific channel numbers and the entrance of such information. Only the index number of favorite channels are required.

A favorite key programmed as above is set to send a sequence of channel shifting signals to the controlled electronic device. The operation-inter-station time (IST), the time between sending a channel shifting signal and sending a subsequent channel shifting signal should be optimized according to how fast the electronic device may be able to change channels. An IST that is too long makes operations too slow while an IST that is too short may not give sufficient time for the controlled electronic device to respond. For household television sets, IST is preferably 8/10 of a second. Because the response time may vary among television sets, it may be desirable to be able to adjust the IST on the remote controller. For example, the remote controller may be adapted to adjust IST as follows: 1) Press a favorite key on which the user wishes to change IST; 2) Press and hold MUTE key for 3 seconds; 3) Press VOLUME UP key or VOLUME DOWN key to increase or decrease IST respectively. Each time when the VOLUME UP key or VOLUME DOWN key is pressed briefly, IST is adjusted by a certain amount of time, for example, 1/10 of the second.

Other Features

In one embodiment, the remote controller 20 is a universal remote controller 20 programmable to control a plurality of electronic devices. When programmed to control a particular target electronic device, each command key operates to transmit command signals to operate an associated function on the target electronic device. The favorite keys 26 are subsequently programmed by the user to access the favorite channels on the target electronic device.

Various types of universal remote controlling methods existing in the prior art may be used. These methods, such as preset signal structure type, learning type, or a combination of these two types, are further described in U.S. Pat. No. 5,726,645 (Kamon et al.), U.S. Pat. Nos. 5,654,714 and 5,745,068 (Takahashi et al.), and U.S. Pat. No. 5,959,751 (Darbee et al.). The above patents are hereby incorporated herein by reference.

Although the favorite keys 26 and the method of programming the favorite keys 26 may be incorporated on a full-featured remote controller 20 which has a comprehensive set of command keys including in numeric key mode, the present invention is best suitable for a remote controller 20 which aims at simplicity in operation and elegance in design. Preferably, the set of command keys includes a CHANNEL UP key 30a and a CHANNEL DOWN key 30b, and also includes essential operational keys such as a POWER ON/OFF key, a VOLUME UP/DOWN key 32a and b, and a MUTE key 34, but does not include many other keys such as numeric keys and keys for advanced and complex functions.

There may also be a special set key for entering the programming mode and/or exiting the programming. Preferably, however, the set command for entering a function may be executed by continuously holding down an operating key, such as the MUTE key 34, for a predetermined period of time (e.g. 3 seconds or longer). The same operating key may be programmed to exit the programming mode when continuously held down for a predetermined period of time (e.g. 3 seconds or longer). Although different regular keys may be used in the manner described above for entering and exiting the programming mode, preferably the same key such as the MUTE key 34 is used for both entering and exiting the programming mode. Alternatively, while in the programming mode, the exiting function may be carried out by pressing in a normal manner a command key whose normal function is unlikely to be used while in the programming mode. This arrangement, however, makes it impossible to retain the normal function of that operating key while the remote controller 20 is in the programming mode.

Preferably, the exiting command signal also operates to store the result of the last programming session and locks in the programed favorite channel on the associated favorite key 26. This is accomplished by assigning the index number to the associated favorite key at the same time as the remote controller exits the programming mode (S206).

In addition, due to the interactivity of the programming according to the present invention, the electronic device must be turned on during programming. Normally, the user would have already turned the electronic device on before entering programming mode. If the user for some reason has not done that, there may be two options in designing the remote controller 20. In one embodiment, the remote controller 20 will do nothing to the controlled electronic device when the user attempts to enter the programming mode if the target electronic device is not already turned on. In another embodiment, the remote controller 20 can be programmed to automatically turn the electronic device on when the operations for entering the programming mode is performed. However, because many electronic devices use toggle type switches for power on and off, the above latter embodiment may cause problems by switching off the electronic device which is already on. The first embodiment is therefore preferred.

Due to use of relative channel shifting commands such as the CHANNEL UP command and CHANNEL DOWN command, each time when the user uses a favorite key 26 to access the associated favorite channel, instead of directly activating the favorite channel, the electronic device first switches to the base channel and then transitions to the target favorite channel, one channel at a time. Consequently, the remote controller 20 according to the present invention is not suitable where the target electronic device has a large number of indexed channels and the user tends to surf the index channels with a wide range. On the other hand, sophisticated "channel surfers" are likely to be attracted to the existing full-featured universal remote controller 20 rather than a type according to the present invention which aims at simplicity of use and elegance in appearance. Furthermore, in the case of a television set, it is found that less than a second is required between pulses to reliably switch between channels. The remote controller 20 according to the present invention therefore has usability as long as the total number of indexed channels is not excessively large.

A related problem is that because a chain of indexed channels has two directions, each index to channel has two conjugated index numbers, one counted from the upward direction and the other from the downward direction. For example, if the total number of indexed channels is ten, a channel that is farthest from the base channel in the upward direction will have an index number of nine, which means that it will take nine pulses (CHANNEL UP signal) to shift from the base channel to this target channel when its associated favorite key 26 is pressed. That channel, however, is also the closest channel to the base channel in the downward direction and will have an index number of −1 if counted in that direction, requiring only one pulse (CHANNEL DOWN signal). Apparently, in this case it is preferable to program the favorite key 26 using the index number −1 instead of +9. Which of the above two possible ways is used to program the favorite key 26 will depend on how the user actually finds the favorite channel during programming of the favorite key 26. For example, if the user shifts the channel upward, the counter will eventually account a +9 when the favorite channel is reached and consequently program the favorite key 26 to transmit a series of nine channel up signals. If the user shifts the channel downward, the counter will count only a −1, resulting in a much simpler command signal for the favorite key 26 programmed. Other channels located far away from the base channel have a similar problem but to a lesser degree. The user, therefore, is advised to have a rough idea of where a favorite channel is located in the chain of indexed channels and choose the shorter cut to reach the channel to be programmed during programming. Such knowledge not only makes the programming itself faster but more importantly creates a more efficient command signal for the favorite key 26 programmed. Alternatively, there may be a provision of entering the total number of channels on the remote controller 20 by the user so that the program stored in the memory 48 of the remote controller 20 may conduct an automatic determination of which way to go when programming a favorite key 26, regardless of how the user programs the favorite key 26. For example, if there are nine index channels in total, and the counter counted a +7 during programming, knowing that there are nine channels in total, the program may automatically assign a −2 instead of +7 to the favorite key 26 programmed. The downside of such a provision is that it will require at least one more input key on the remote controller 20 to facilitate an entrance of the total number of indexed channels. It also makes the operation of the remote controller 20 more complicated. In any event, lacking or not using such a feature will not affect the basic functionality of the remote controller 20. The feature therefore, if provided, will be an option for users who desire more adjustability without affecting the usability by other users.

Although, the remote controller 20 according to the present invention has mainly been described in relation favorite keys 26 that are conveniently programmed to quickly access favorite channels, it should be understood that in the normal operating mode CHANNEL UP and CHANNEL DOWN keys may be used in a regular manner to access any indexed channels.

Although the present invention has been described with reference to preferred embodiments, workers skilled in the art will recognize that changes may be made in form and detail without departing from the spirt and scope of the invention. For example, although the remote controller 20 according to the present invention has mainly been described in relation to favorite channels in a television set, favorite channels or stations on a stereo, radio or other electronic equipment are equally applicable in accordance with the present invention. Consequently, references herein to channels should be understood to mean television channels as well as stereo or radio stations.

What is claimed is:

1. A method of programming a remote controller having a plurality of keys to control a target electronic device, the method comprising:

entering a programming mode;
   determining an index number of a favorite channel in a plurality of indexed channels;
   programming a programmable favorite key based on the index number of the favorite channel according to a predetermined relation; and
   exiting the programming mode, wherein entering a programming mode comprises:
   switching the channel of the target electronic device from the initial channel to a predetermined base channel if the target electronic device is already turned on and is at an initial channel before the remote control enters the programming mode.

2. A method of programming a remote controller having a plurality of keys to control a target electronic device, the method comprising:

entering a programming mode;
   determining an index number of a favorite channel in a plurality of indexed channels;
   programming a programmable favorite key based on the index number of the favorite channel according to a predetermined relation; and
   exiting the programming mode, wherein the plurality of indexed channels are preselected on the target electronic device and form an index chain in which each channel is sequentially followed by another channel, the index chain having an upward direction and a downward direction, wherein the step of determining the index number of the favorite channel in the plurality of indexed channels comprises:
   counting a net number of moves n from a predetermined base channel to the favorite channel, wherein a move from one channel to an immediate channel in the upward direction being counted as a plus move and a move from one channel to an immediate channel in the downward direction being counted as a minus move, and the net number of moves n being the algebraic sum of the plus moves and minus moves needed to move the base channel to the favorite channel.

3. A method of programming a remote controller having a plurality of keys to control a target electronic device, the method comprising:

entering a programming mode;
   determining an index number of a favorite channel in a plurality of indexed channels;
   programming a programmable favorite key based on the index number of the favorite channel according to a predetermined relation; and
   exiting the programming mode, wherein the plurality of indexed channels are preselected on the target electronic device and form an index chain in which each channel is sequentially followed by another channel, the index chain having an upward direction and a downward direction; the remote control has a plus key and a minus key; and wherein pressing the plus key once briefly moves the present channel to the next channel in the upward direction, while pressing the minus key once briefly moves the present channel to the next channel in the downward direction; wherein determining an index number of a favorite channel in a plurality of indexed channels comprises:
   moving the working channel of the target electronic device from a predetermined base channel to the favorite channel by selectively pressing the plus key and the minus key; and
   counting the net increase or the net decrease of a relative channel index number n by increasing n by one each time when the plus key is pressed and decreasing n by one each time the minus key is pressed.

4. A method of programming a remote controller having a plurality of keys to control a target electronic device, the method comprising:

entering a programming mode;
   determining an index number of a favorite channel in a plurality of indexed channels;
   programming a programmable favorite key based on the index number of the favorite channel according to a predetermined relation; and
   exiting the programming mode, wherein the plurality of indexed channels are preselected on the target electronic device and form an index chain in which each channel is sequentially followed by another channel, the index chain having an upward direction and a downward direction; the remote control has a plus key and a minus key: and wherein pressing the plus key once briefly moves the present channel to the next channel in the upward direction, while pressing the minus key once briefly moves the present channel to the next channel in the downward direction; wherein determining an index number of a favorite channel in a plurality of indexed channels comprises:
   moving the working channel of the target electronic device from a predetermined base channel to the favorite channel by selectively pressing the plus key and the minus key; and
   counting the net increase or the net decrease of a relative channel index number n by increasing n by one each time when the plus key is pressed and decreasing n by one each time the minus key is pressed, and wherein counting is accomplished by a counter in the remote control.

5. A method of programming a remote controller having a plurality of keys to control a target electronic device, the method comprising:

entering a programming mode;
   determining an index number of a favorite channel in a plurality of indexed channels;
   programming a programmable favorite key based on the index number of the favorite channel according to a predetermined relation; and
   exiting the programming mode, wherein the plurality of indexed channels are preselected on the target electronic device and form an index chain in which each channel is sequentially followed by another channel, the index chain having an upward direction and a downward direction; the remote control has a plus key and a minus key; and wherein pressing the plus key once briefly moves the present channel to the next channel in the upward direction, while pressing the minus key once briefly moves the present channel to the next channel in the downward direction; wherein determining an index number of a favorite channel in a plurality of indexed channels comprises:
   a moving the working channel of the target electronic device from a predetermined base channel to the favorite channel by selectively pressing the plus key and the minus key; and
   counting the net increase or the net decrease of a relative channel index number n by increasing n by one each time when the plus key is pressed and decreasing n by one each time the minus key is pressed, the method further comprising:

resetting the relative channel index number n to zero;

starting the counting toward the relative channel index number n upon entering into the programming mode; and stopping the counting toward the relative channel index number n up exiting the programming mode.

6. A method of programming a remote controller having a plurality of keys to control a target electronic device, the method comprising:

entering a programming mode;

determining an index number of a favorite channel in a plurality of indexed channels;

programming a programmable favorite key based on the index number of the favorite channel according to a predetermined relation; and exiting the programming mode, wherein the plurality of indexed channels are preselected on the target electronic device and form an index chain in which each channel is sequentially followed by another channel, the index chain having an upward direction and a downward direction; the remote control has a plus key and a minus key; and wherein pressing the plus key once briefly moves the present channel to the next channel in the upward direction, while pressing the minus key once briefly moves the present channel to the next channel in the downward direction; wherein determining an index number of a favorite channel in a plurality of indexed channels comprises:

moving the working channel of the target electronic device from a predetermined base channel to the favorite channel by selectively pressing the plus key and the minus key; and counting the net increase or the net decrease of a relative channel index number n by increasing n by one each time when the plus key is pressed and decreasing n by one each time the minus key is pressed, and wherein the remote controller has a plurality of programmable favorite keys, the method further comprising:

selecting a programmable favorite key from the plurality of programmable favored keys;

starting counting toward the relative channel number upon entering into programming mode;

assigning the net increase or the net decrease of the relative channel index number n to the selected programmable favorite key; and stopping counting toward the relative channel index number n upon exiting the programming mode.

7. A method of programming a remote controller having a plurality of keys to control a target electronic device, the method comprising:

entering a programming mode;

determining an index number of a favorite channel in a plurality of indexed channels;

programming a programmable favorite key based on the index number of the favorite channel according to a predetermined relation; and exiting the programming mode, wherein the plurality of indexed channels are preselected on the target electronic device and form an index chain in which each channel is sequentially followed by another channel, the index chain having an upward direction and a downward direction; the remote control has a plus key and a minus key; and wherein pressing the plus key once briefly moves the present channel to the next channel in the upward direction, while pressing the minus key once briefly moves the present channel to the next channel in the downward direction; wherein determining an index number of a favorite channel in a plurality of indexed channels comprises:

moving the working channel of the target electronic device from a predetermined base channel to the favorite channel by selectively pressing the plus key and the minus key; and counting the net increase or the net decrease of a relative channel index number n by increasing n by one each time when the plus key is pressed and decreasing n by one each time the minus key is pressed, and wherein the remote controller has a plurality of programmable favorite keys; the remote controller further has a program for counting and storing relative channel index numbers i, each number i being corresponding to one of the plurality of programmable favorite keys, the method further comprising:

selecting a programmable favorite key from the plurality of programmable favored keys;

resetting the corresponding relative channel index number to zero;

entering into the programming mode; and assigning the corresponding relative channel index number n to the selected programmable favorite key.

8. A method of programming a remote controller having a plurality of keys to control a target electronic device, the method comprising:

entering a programming mode;

determining an index number of a favorite channel in a plurality of indexed channels;

programming a programmable favorite key based on the index number of the favorite channel according to a predetermined relation; and exiting the programming mode, wherein the plurality of indexed channels are preselected on the target electronic device and form an index chain in which each channel is sequentially followed by another channel, the index chain having an upward direction and a downward direction; the remote control has a plus key and a minus key; and wherein pressing the plus key once briefly moves the present channel to the next channel in the upward direction, while pressing the minus key once briefly moves the present channel to the next channel in the downward direction; wherein determining an index number of a favorite channel in a plurality of indexed channels comprises:

moving the working channel of the target electronic device from a predetermined base channel to the favorite channel by selectively pressing the plus key and the minus key; and counting the net increase or the net decrease of a relative channel index number n by increasing n by one each time when the plus key is pressed and decreasing n by one each time the minus key is pressed, wherein counting is accomplished by a counter in the remote control, and wherein the plurality of indexed channels on the target electronic device include a total number of N channels, the step of programming the programmable favorite key comprising:

assigning to the programmable favorite key a repetition of i times the command code for the plus key; or, assigning to the programmable favorite key a repetition of N−i times the command code for the minus key.

9. A method of programming a remote controller having a plurality of keys to control a target electronic device, the method comprising:
   entering a programming mode;
   determining an index number of a favorite channel in a plurality of indexed channels;
   programming a programmable favorite key based on the index number of the favorite channel according to a predetermined relation; and
   exiting the programming mode, wherein the plurality of indexed channels are preselected on the target electronic device and form an index chain in which each channel is sequentially followed by another channel, the index chain having an upward direction and a downward direction; the remote control has a plus key and a minus key; and wherein pressing the plus key once briefly moves the present channel to the next channel in the upward direction, while pressing the minus key once briefly moves the present channel to the next channel in the downward direction; wherein determining an index number of a favorite channel in a plurality of indexed channels comprises:
      moving the working channel of the target electronic device from a predetermined base channel to the favorite channel by selectively pressing the plus key and the minus key; and
      counting the net increase or the net decrease of a relative channel index number n by increasing n by one each time when the plus key is pressed and decreasing n by one each time the minus key is pressed, wherein counting is accomplished by a counter in the remote control, wherein the plurality of indexed channels on the target electronic device include t total number of N channels, the step of programming the programmable favorite key comprising:
         assigning to the programmable favorite key a repetition of i times the command code for the plus key; or,
         assigning to the programmable favorite key a repetition of N−i times the command code for the minus key, and wherein the step of programming in the programmable favorite key comprising:
            if i<N−i assigning to the programmable favorite key a repetition of n times the command code for the plus key on the remote control;
            if i>N−i assigning to the programmable favorite key a repetition of N−i times the command code for the minus key on the remote control; and
            if i=N−i assigning to the programmable favorite key a repetition of n times either the command code for the plus key or a repetition of n times the command code for the minus key.

10. A remote controller having a plurality of operating keys for causing predetermined control signals to be transmitted to an electronic device in response to the operation of the operating key to execute respective operations of the electronic device, comprising:
   a microprocessing unit including a CPU and a memory;
   a keyboard coupled to the microprocessing unit including a set of command keys and a programmable favorite key, the set of command keys including at least one channel shifting key to sequentially shift the working channel of the electronic device;
   transmissions circuitry coupled to the microprocessing unit
   command codes stored in the memory for creating corresponding command signals which are transmitted by the transmission circuitry to a controlled electronic device to cause the controlled electron device to perform specific command functions; and
   a program stored in the memory to accomplish the following operations:
      a) determining an index number of a selected indexed channel in a set of indexed channels; and
      b) assigning the information about the index number of the favorite channel to a selected favorite key, and wherein the program comprises a counting program which, when activated, counts the number of times the channel shifting key has been operated and outputs a variable i which represents the index number of the channel the user last accessed.

11. A remote controller having a plurality of operating keys for causing predetermined control signals to be transmitted to an electronic device in response to the operation of the operating key to execute respective operations of the electronic device, comprising:
   a microprocessing unit including a CPU and a memory;
   a keyboard coupled to the microprocessing unit including a set of command keys and a programmable favorite key, the set of command keys including at least one channel shifting key to sequentially shift the working channel of the electronic device;
   transmissions circuitry coupled to the microprocessing unit
   command codes stored in the memory for creating corresponding command signals which are transmitted by the transmission circuitry to a controlled electronic device to cause the controlled electron device to perform specific command functions; and
   a program stored in the memory to accomplish the following operations:
      a) determining an index number of a selected indexed channel in a set of indexed channels; and
      b) assigning the information about the index number of the favorite channel to a selected favorite key, wherein the program comprises a counting program which, when activated counts the number of times the channel shifting key has been operated and outputs a variable i which represents the index number of the channel the user last accessed, the remote controller further comprising a program stored in the memory for enabling the remote controller to perform the following functions:
   detecting a first predetermined input or a sequence of inputs, and upon such a detection, entering into a programming mode, automatically transmitting a command signal to switch the target electronic device to a predetermined base channel, activating the counting program; and
   detecting a second predetermined input or a sequence of inputs, and upon such a detection, storing the output of the counting program, and exiting the programmable mode.

12. A remote controller having a plurality of operating keys for causing predetermined control signals to be transmitted to an electronic device in response to the operation of the operating key to execute respective operations of the electronic device, comprising:
   a microprocessing unit including a CPU and a memory;
   a keyboard coupled to the microprocessing unit including a set of command keys and a programmable favorite key, the set of command keys including at least one channel shifting key to sequentially shift the working channel of the electronic device;

transmissions circuitry coupled to the microprocessing unit command codes stored in the memory for creating corresponding command signals which are transmitted by the transmission circuitry to a controlled electronic device to cause the controlled electron device to perform specific command functions; and a program stored in the memory to accomplish the following operations:
  a) determining an index number of a selected indexed channel in a set of indexed channels; and
  b) assigning the information about the index number of the favorite channel to a selected favorite key, wherein the program comprises a counting program which, when activated counts the number of times the channel shifting key has been operated and outputs a variable i which represents the index number of the channel the user last accessed, and wherein the first and the second predetermined inputs or sequences of inputs comprise operations on the keyboard.

13. A remote controller having a plurality of operating keys for causing predetermined control signals to be transmitted to an electronic device in response to the operation of the operating key to execute respective operations of the electronic device, comprising:

a microprocessing unit including a CPU and a memory;

transmissions circuitry coupled to the microprocessing unit;

command codes stored in the memory for creating corresponding command signals which are transmitted by the transmission circuit to a controlled electronic device to cause the controlled electron device to perform specific command functions; and a keyboard coupled to the microprocessing unit including a set of command keys and a programmable favorite key, the set of command keys including at least one channel shifting key to sequentially shift the working channel of the electronic device;

wherein:
  each programmable favorite key is programmed to transmit a sequential string of command signals comprising a number of channel shifting command signals so that an operation on the favorite key shifts the working channel on the controlled electronic device to a favorite channel associated with the favorite key the remote controller further comprising a program stored in the memory to determine an index number of a favorite channel relative to a predetermined base channel, wherein:
    the sequential string of command signals transmitted by each programmable favorite key further comprises an initial command signal which switches the working channel on the controlled electronic device to the predetermined base channel, the number of channel shifting command signals subsequently transmitted being determined by the index number of the favorite channel relative to the predetermined base channel.

14. A remote controller having a plurality of operating keys for causing predetermined control signals to be transmitted to an electronic device in response to the operation of the operating key to execute respective operations of the electronic device, comprising:

a microprocessing unit including a CPU and a memory;

transmissions circuitry coupled to the microprocessing unit;

command codes stored in the memory for creating corresponding command signals which are transmitted by the transmission circuit to a controlled electronic device to cause the controlled electron device to perform specific command functions; and a keyboard coupled to the microprocessing unit including a set of command keys and a programmable favorite key, the set of command keys including at least one channel shifting key to sequentially shift the working channel of the electronic device;

wherein:
  each programmable favorite key is programmed to transmit a sequential string of command signals comprising a number of channel shifting command signals so that an operation on the favorite key shifts the working channel on the controlled electronic device to a favorite channel associated with the favorite key the remote controller having an operating mode and a programming mode, the remote controller further comprising a program stored in the memory to accomplish the following functions:
    in the programming mode, determining an index number of a favorite channel the relative to a predetermined base channel and assigning the information on the index number to a selected favorite key to be associated with the favorite channel;
    in the operating mode, determining an index number of a present channel accessed by a user using the remote controller; and
    when the favored key is pressed by user, determine a hopping distance from the present channel to the favorite channel on the basis of the index number of the present channel and the index number of the favorite channel.

15. A control circuitry used in a remote controller to remotely control an electronic device which has a plurality of operating channels, the control circuitry comprises:

a CPU and a memory, wherein the CPU is adapted to receive input commands through a matrix encoding portion when connected to a plurality of operating keys including a channel shifting key, and wherein the memory contains a counting program which counts the number of times the channel shifting key has been operated, wherein the CPU is adapted to receive input commands of a CHANNEL UP key 30a and a CHANNEL DOWN and wherein the accounting program counts an operation on the CHANNEL UP key 30a as a positive number and an operation on the CHANNEL DOWN as a negative number and has an algorithm to determine an index number based on the algebraic sum of the positive number and the negative number, and wherein the counting program has an algorithm to determine a plurality of index numbers, each index number being determined in an associated sequence and once determined, being stored in the memory.

* * * * *